US009573666B2

(12) United States Patent
Rivault

(10) Patent No.: US 9,573,666 B2
(45) Date of Patent: Feb. 21, 2017

(54) LONGITUDINAL SCOOPS FOR ROLLING STABILITY

(71) Applicant: Zodiac Aerosafety Systems, Plaisir (FR)

(72) Inventor: Jean-Yves Rivault, Hiersac (FR)

(73) Assignee: Zodiac Aerosafety Systems, Plaisir (FR)

( * ) Notice: Subject to any disclaimer, the term of this patent is extended or adjusted under 35 U.S.C. 154(b) by 0 days.

(21) Appl. No.: 14/740,351

(22) Filed: Jun. 16, 2015

(65) Prior Publication Data

US 2015/0360758 A1    Dec. 17, 2015

Related U.S. Application Data

(60) Provisional application No. 62/013,075, filed on Jun. 17, 2014.

(51) Int. Cl.
*B63B 43/14* (2006.01)
*B63B 7/06* (2006.01)
(Continued)

(52) U.S. Cl.
CPC ............... *B63B 43/14* (2013.01); *B63B 7/06* (2013.01); *B63B 39/03* (2013.01); *B63B 43/04* (2013.01);
(Continued)

(58) Field of Classification Search
CPC .................................................... B63B 43/06
See application file for complete search history.

(56) References Cited

U.S. PATENT DOCUMENTS 3,467,343 A   9/1969   Violleau
6,029,595 A   2/2000   Bachmann
(Continued)

FOREIGN PATENT DOCUMENTS

DE    4243678 A1   6/1994
EP    0178963 A1   4/1986
(Continued)

OTHER PUBLICATIONS

International Patent Application No. PCT/IB2015/054547, Search Report and Written Opinion dated Oct. 8, 2015.

*Primary Examiner* — Edwin Swinehart
(74) *Attorney, Agent, or Firm* — Kilpatrick Townsend & Stockton LLP; Dean W. Russell; Shin Tsen Chang

(57) ABSTRACT

The invention generally relates to devices for stabilizing floating structures and systems and methods utilizing such stabilization devices. Some embodiments of the stabilization device include a fabric material having a collapsed configuration and an expanded configuration. The expanded configuration of the fabric material may form a column of the fabric material. The column of fabric material may define an internal volume. The front end of the column of fabric material may be closed, and the back end of the column of fabric material may define an opening for receiving water for filling the internal volume. When filled with water, the stabilization device may improve roll stabilization of a floating structure. The floating structure may be a flotation device of an emergency flotation system, boat, or inflatable raft, for example. The emergency flotation system may be used with aircraft, (e.g., helicopters) to provide stabilization when the aircraft is ditched in water.

18 Claims, 5 Drawing Sheets

(51) Int. Cl.
*B63B 39/03* (2006.01)
*B63B 43/04* (2006.01)
*B63B 43/06* (2006.01)
*B64C 25/54* (2006.01)
*B64C 25/56* (2006.01)
*B64D 25/18* (2006.01)
*B64C 25/32* (2006.01)

(52) U.S. Cl.
CPC ............... *B63B 43/06* (2013.01); *B64C 25/54* (2013.01); *B64C 25/56* (2013.01); *B64D 25/18* (2013.01); *B64C 2025/325* (2013.01)

(56) References Cited

U.S. PATENT DOCUMENTS

| | | | |
|---|---|---|---|
| 6,830,170 B2 * | 12/2004 | Abel | .................. A01M 31/006 190/107 |
| 2003/0015527 A1 | 1/2003 | Schneider | |
| 2003/0106478 A1 | 6/2003 | Mears et al. | |

FOREIGN PATENT DOCUMENTS

| | | |
|---|---|---|
| EP | 2733066 A1 | 5/2014 |
| GB | 2003102 A1 | 3/1979 |

* cited by examiner

LONGITUDINAL SCOOPS FOR ROLLING STABILITY

CROSS REFERENCE TO RELATED APPLICATION

This application claims priority to and the benefit of U.S. Provisional Patent Application No. 62/013,075 filed on Jun. 17, 2014, the contents of which are incorporated herein by reference.

BACKGROUND OF THE INVENTION

The present invention generally relates to stabilization devices for use with vehicles, vessels, crafts, flotation systems, and/or structures to improve stabilization when they are floating on a water surface and systems and methods utilizing such stabilization devices.

Vehicles, vessels, crafts, flotation systems, and/or structures, such as boats and rafts, may be at risk of overturning and/or capsizing due to rough conditions on the surface of the water. This may be particularly true for vehicles, vessels, systems, and/or structures that are not primarily designed for handling rough or extreme surface conditions such as life rafts. For example, some aircraft (e.g., helicopters or the like) may be fitted with emergency flotation systems ("EFS") that are designed to prevent the aircraft from sinking in the event of a crash landing on water. While such EFSs may prevent the aircraft from sinking during normal water surface conditions, rough or abnormal water surface conditions may destabilize the aircraft (e.g., excessive rolling, overturning, etc.) while floating and may thereby interfere with passenger evacuation post ditching. This may be particularly true with helicopters, given their generally high center of gravity due to the location of the rotors, the transmission and the engines.

Accordingly, improved stabilization devices may be desired that increase a sea state range of vehicles, vessels, crafts, flotation systems, and/or structures. In particular, it may be desirable to improve EFSs to have increased roll stabilization to allow additional time for passenger evacuation during emergency situations and during rough water surface conditions.

SUMMARY OF THE INVENTION

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Some embodiments generally relate to devices for stabilizing floating structures and systems and methods utilizing such stabilization devices. The stabilization devices may deploy to act as a scoop, bucket, or cup configured to be filled with water. The filling of the stabilization device with water allows the stabilization device to keep its shape in the water during pitching and/or rolling movement. When the stabilization device moves in this deployed water-filled configuration, it may create drag and inertia loads that help restore moment and decrease the amount of pitching and/or rolling experienced by the coupled system.

Embodiments described herein may be collapsible/expandable and utilized with inflatable flotation systems and/or crafts. Optionally, the stabilization devices may be configured to increase a roll stabilization. Other embodiments may be directed to inflatable craft or flotation systems including such stabilization devices. For example, some embodiments may be directed to an inflatable raft including embodiments of the stabilization device described herein. Other embodiments may be directed to emergency flotation systems including a flotation device coupled with one or more stabilization devices.

In some aspects, a stabilization device for attachment along a length of a flotation device is provided to increase roll stabilization of the flotation device. The stabilization device may include a fabric material and a collapsible frame supporting the fabric material. The collapsible frame may have a collapsed configuration and an expanded configuration. The expanded configuration of the collapsible frame may support the fabric material to form a column of the fabric material. The column of fabric material formed when the collapsible frame is in the expanded configuration may have a front end, a back end, and a length therebetween. Additionally, the column of fabric material formed when the collapsible frame is in the expanded configuration may define an internal volume. The front end of the column of fabric material may resist fluid entry to the internal volume defined by the column of fabric material. The back end of the column of fabric material may define an opening for receiving water for filling the internal volume defined by the column of fabric material when the collapsible frame is in the expanded configuration. In some embodiments, when the column of fabric material formed when the collapsible frame is in the expanded configuration fills with water, the stabilization device provides additional stabilization to an attached device and/or system.

In some embodiments, the collapsible frame may be a helical plastic bar. The column of fabric formed by the expanded configuration of the collapsible frame may have a circular, square, rectangular, oval, triangular, pentagonal, hexagonal cross-section or the like.

In some embodiments, the collapsible frame is biased toward the expanded configuration. Optionally, the bias toward the expanded configuration may provide for a passively deployed stabilization device.

A top portion of the column formed when the collapsible frame is in the expanded configuration may include openings. The openings along the top portion of the column may be configured to allow fluid (e.g., water or air) to enter and/or exit from the top portion of the column formed when the collapsible frame is in the expanded configuration. Optionally, the openings along the top portion of the column of fabric material may be defined by fishnet material disposed along the top portion of the column of fabric material formed when the collapsible frame is in the expanded configuration. In some embodiments, the fishnet material may run along an entire length of the column of fabric material formed when the collapsible frame is in the expanded configuration.

In further embodiments, the fabric material may cover the front end of the column of fabric material formed when the collapsible frame is in the expanded configuration. The fabric material covering the front end of the column of fabric material may be configured to resist air entry into the internal volume defined by the column of fabric material such that air forced against the front end of the column of fabric material may urge the collapsible frame from the expanded configuration toward the collapsed configuration or a partially collapsed configuration.

Additionally, the fabric material forming the column of fabric material formed when the collapsible frame is in the expanded configuration may be configured to resist air entry into the internal volume defined by the column of fabric material such that air forced laterally against the column of fabric material may urge the collapsible frame from the expanded configuration toward the collapsed configuration or a partially collapsed configuration.

The length of the column of fabric material formed when the collapsible frame is in the expanded configuration may be greater than at least half the length of the flotation device. Optionally, the length of the column of fabric material formed when the collapsible frame is in the expanded configuration may be greater than at least three-fourths the length of the flotation device. In some embodiments, the float may have a generally cylindrical body (e.g., circular, elliptic, or the like) with ellipsoidal (or spherical) ends. The stabilization device may have a length approximately equal to a length of the cylindrical body of the float. Optionally, the ends of the stabilization device may be aligned with the generally cylindrical body of the float such that the ends of the stabilization device stop at the beginning of the ellipsoidal ends of the float.

In some embodiments a flotation system is provided that includes a stabilization device as described herein coupled with a flotation device. In some embodiments, an emergency flotation system is provided. The emergency flotation system may include a plurality of flotation systems that include a stabilization device coupled with flotation device. In still further embodiments of the present invention, an aircraft or a boat may be provided. The aircraft and/or boat may include an emergency flotation system described herein. The emergency flotation system may include one or more flotation systems. The one or more flotation systems may include one or more flotation devices coupled with a stabilization device described herein.

In further aspects of the present invention, an emergency flotation system may be provided. The emergency flotation system may include a flotation device inflatable from an uninflated state to an inflated state. The flotation device in the inflated state may have a front end, a back end, and a length therebetween. A stabilization device may be attached along the length of the flotation device. The stabilization device may include a collapsible fabric material having a collapsed configuration and an expanded configuration. The collapsible fabric material may be passively biased toward the expanded configuration where the fabric material forms a column of the fabric material. The column of fabric material may have a front end, a back end, and a length therebetween and may define an internal volume. The front end of the column of fabric material may be closed. The back end of the column of fabric material may define an opening for receiving water for filling the internal volume defined by the column of fabric material when the fabric material is in the expanded configuration.

In some embodiments, the fabric material may be internally supported by an elastic frame that passively biases the fabric material toward the expanded configuration. The column of the fabric material formed when the fabric material is in the expanded configuration may be parallel with the flotation device and centered along a length of the flotation device when the flotation device is in the inflated state. The stabilization device may be in the collapsed configuration when the flotation device is in the uninflated configuration. The stabilization device may be configured to transition towards the expanded configuration only with the inflation of the flotation device. Optionally, the stabilization device may be maintained in the collapsed configuration against the flotation device with water soluble fasteners (e.g., water soluble thread, etc.).

The invention will be better understood on reading the following description and examining the figures that accompany it. These figures are provided by way of illustration only and are in no way limiting on the invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
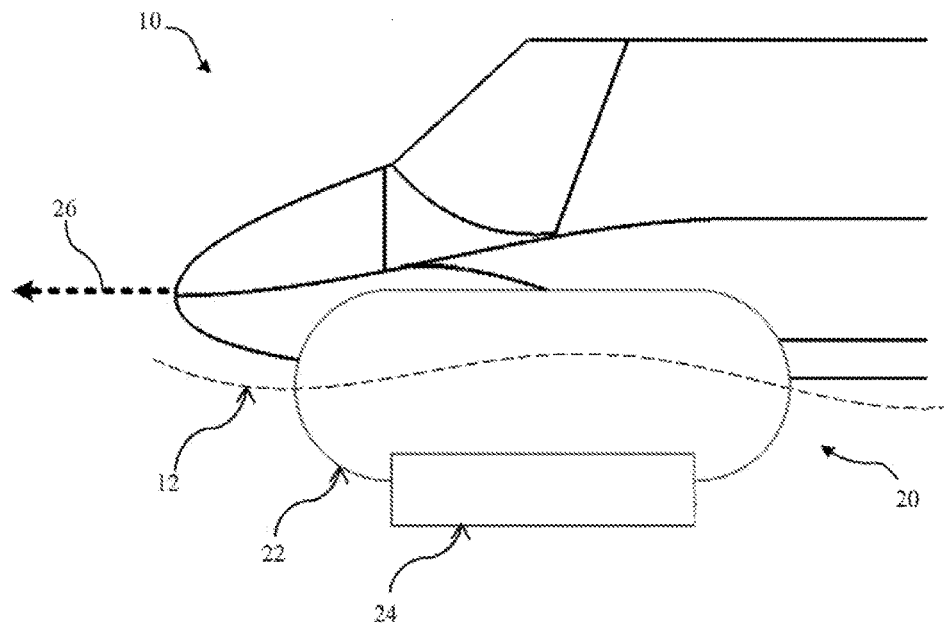
FIG. 1 illustrates a side view of an exemplary aircraft equipped with an exemplary emergency flotation system according to some embodiments of the present invention.
Figure 2:
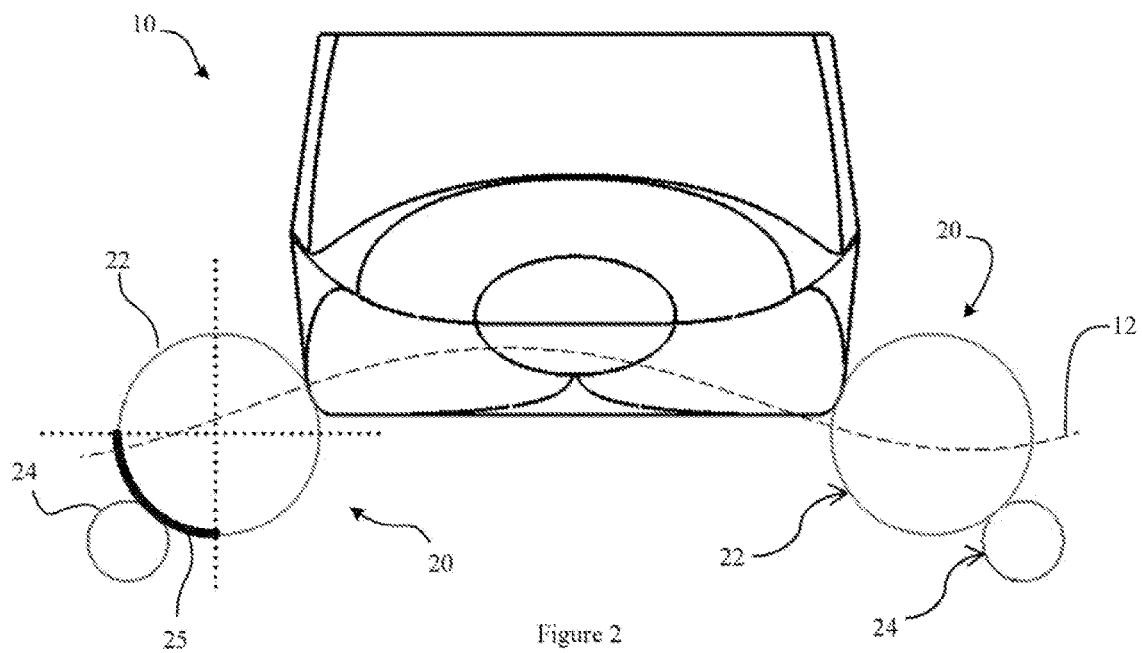
FIG. 2 illustrates a front view of the exemplary emergency flotation system of FIG. 1 according to some embodiments of the present invention.

FIG. 1 illustrates a side view of an exemplary aircraft 10 with an exemplary emergency flotation system (EFS) 20 deployed to maintain the aircraft 10 generally above the surface of the water 12, according to some embodiments of the present invention. FIG. 2 illustrates a front view of the exemplary aircraft 10 of FIG. 1. FIG. 1 and FIG. 2 may be illustrative of an aircraft 10 which ditched or crash landed in a body of water (e.g., ocean, sea, lake, river, or the like) and where the emergency flotation system 20 has deployed to help prevent the airframe of the aircraft 10 from sinking or capsizing. In many embodiments, the EFS 20 may provide a sufficient flotation duration for passengers of the aircraft 10 to evacuate post ditching. The aircraft 10 may be any type of commercial, industrial, or personal aircraft. In many embodiments aircraft 10 may be a helicopter.

The exemplary EFS 20 includes two flotation devices 22, each coupled with a stabilization device 24. In normal (non-emergency) operation, the flotation devices 22 and the stabilization devices 24 of the EFS 20 may be uninflated and collapsed into packs. The EFS 20 may be packed within spaces inside the airframe of the aircraft 10 or may be externally mounted packs coupled with the airframe or other portions of the aircraft 10. For example, in some embodiments, the EFS 20 may be externally mounted packs coupled with the helicopter skids and/or other portions of the helicopter. Optionally, the EFS 20 packs may be used to retrofit an aircraft (e.g., helicopter) that lacks an integrated EFS.

In use (e.g., during an emergency landing in the water), the packed and stored flotation devices 22 of EFS 20 may be inflated and deployed from their uninflated configuration to their inflated configurations (illustrated in FIGS. 1 and 2) using gas stored in pressured cylinders. Additionally, the stabilization devices 24 may also be deployed with the inflation and deployment of the flotation device 22. In some embodiments, the stabilization device 24 could be packed on a cover of the flotation device 22. In such an embodiment, the cover may stay attached to the flotation device 22 in the deployed configuration and the stabilization device 24 may stay attach to the cover. Moreover the use of water soluble fasteners may be beneficial to keep the stabilization device 24 packed during normal flight operation.

In some embodiments, the flotation device 22 is attached to the stabilization device 24 to be generally parallel to the stabilization device 24. Optionally, the stabilization device 24 may be centered with the flotation device 22 along a length of flotation device 22 as illustrated in FIG. 1. In some embodiments, a length of the stabilization device 24 may be at least half of the length of the flotation device 22. Optionally, the length of the stabilization device may be at least three-fourths the length of the flotation device 22. In still further embodiments, the stabilization device 24 may have a length greater than or equal to the length of the flotation device 22. In some embodiments, the stabilization device 22 may have a diameter between 25-50% of the diameter of flotation device 24. Optionally, the stabilization device 22, when deployed, may define an internal volume for receiving water between 5-20% (e.g., at least 10%) of an inflated volume of a corresponding float 24.

When the EFS 20 is deployed and when the aircraft 10 is floating on the water surface 12, the stabilization device 24 may be on an opposite side of the flotation device 22 relative to the aircraft 10 as illustrated in FIG. 2. For example, when viewing the front of the flotation device 22 in FIG. 2, the stabilization device 24 may be attached along a bottom quadrant 25 of the flotation device 22 that is furthest from the aircraft 10. Such an arrangement of the flotation device 22 with the stabilization device 24 may ensure filling of the stabilization device 24 with water as the stabilization device 24 is positioned on the bottom half or underside of the flotation device 22 and the top half or topside of flotation device 22 may remain generally above the water surface. Additionally, the arrangement of the stabilization device 24 on a side of the flotation device 22 opposite the aircraft 10 may provide additional stabilization for the aircraft 10 against rolling. Rolling is movement about axis 26. Accordingly, in some embodiments, the stabilization device 24 may be positioned at 45° or less (e.g., 35° or less, or 25° or less, etc.) relative to a downward vertical the flotation device 22 (when viewed along an axis of the flotation device 22) and away from the aircraft 10.

While illustrated with two flotation devices 22, it should be understood that an EFS may include additional flotation devices 22 (e.g., for a back portion of the aircraft 10, not shown). For example, in some embodiments, an EFS may include 3, 4, 5, 6 or more flotation devices 22 depending on the type of aircraft 10. Further, it should be understood that each flotation device 22 may be coupled with more than one stabilization device 24 and, vice versa, more than two flotation devices 22 may be coupled with a single stabilization device 24. For example, a plurality of flotation devices 22 may be adjacent one another (in series and/or parallel) and the plurality of flotation devices 22 may be coupled with a single stabilization device 24.

Figure 3:
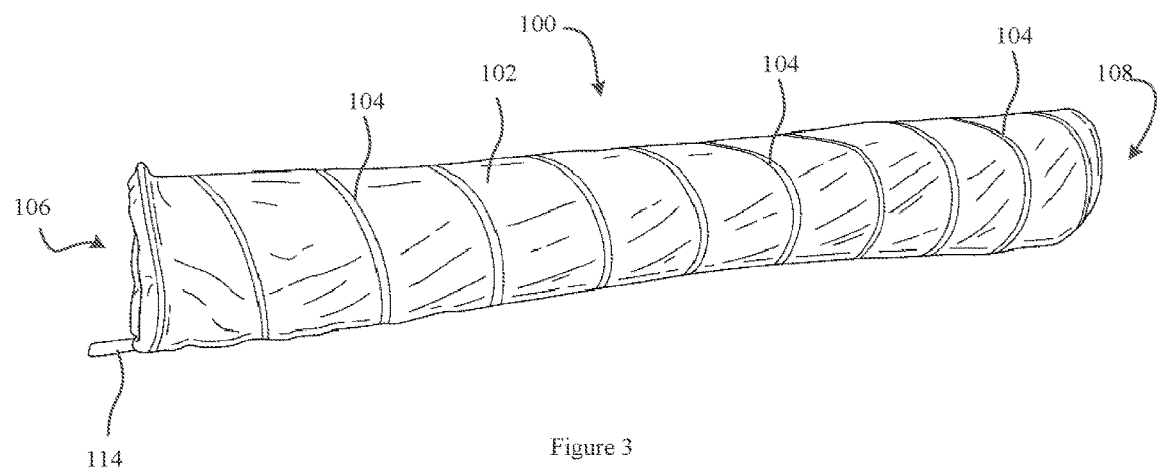
FIG. 3 illustrates a side view of an exemplary stabilization system according to some embodiments of the present invention.
Figure 4:
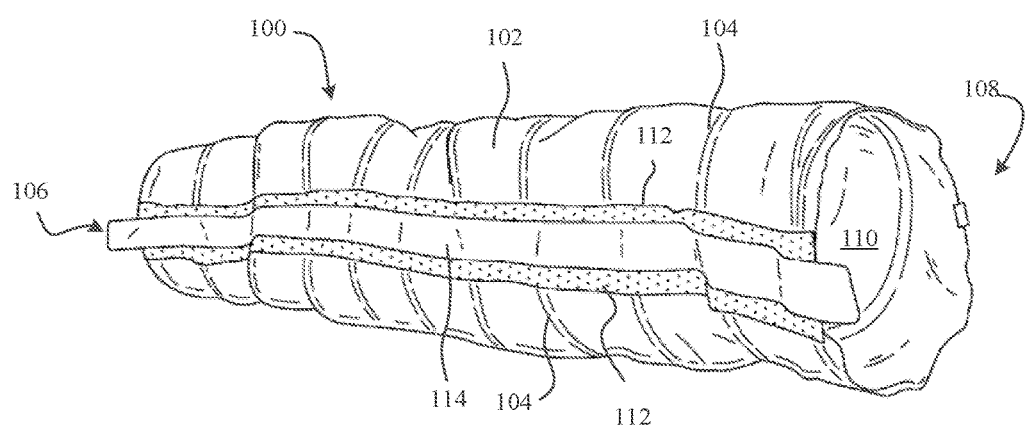
FIG. 4 illustrates another view of the exemplary stabilization system of FIG. 3 according to some embodiments of the present invention.
Figure 5:
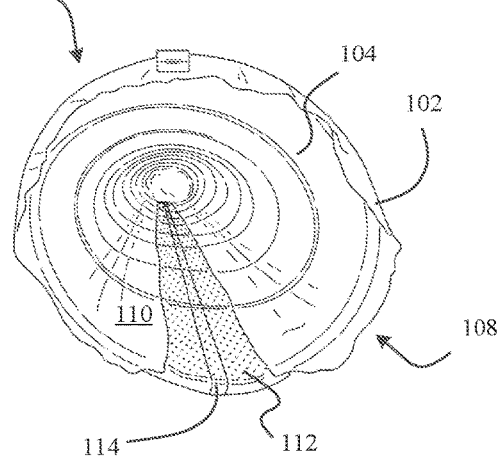
FIG. 5 illustrates a view of the interior of the exemplary stabilization system of FIG. 3 and FIG. 4 according to some embodiments of the present invention.

FIGS. 3-5 illustrate a number of views of an exemplary stabilization device 100 in a deployed configuration according to some embodiments of the present invention. FIG. 3 illustrates a side view of the exemplary stabilization device 100. FIG. 4 illustrates another view of the exemplary stabilization device 100. FIG. 5 illustrates a view of the interior of the exemplary stabilization device 100. Stabilization device 100 may include a fabric material 102 supported by a collapsible frame 104. The fabric material 102 and the collapsible frame 104 may have a collapsed configuration and a deployed/expanded configuration. In the deployed configuration, as shown in FIGS. 3-5, the stabilization device 100 may form an elongate column having a front end 106, a back end 108, and a length therebetween. The elongate column may generally define an internal volume 110 that is configured to be filled with water. While illustrated as generally having a circular cross-section, other embodiments may have oval or elliptical cross-sections, triangular cross-sections, rectangular cross-sections, pentagonal cross-sections, hexagonal cross-sections, or the like. The front end 106 may be closed and the back end 108 may be open. When in use (deployed and in the water), the opening defined by the back end 108 may allow a large volume of water to fill the internal volume 110 of the deployed stabilization device 100 quickly. The filling of the internal volume 110 with water allows the device 100 to keep its shape in the water during pitching and/or rolling movement. When the stabilization device 100 moves in this configuration, it will create drag and inertia loads that will lead to restoring moment and decrease the amount of pitching and/or rolling experienced. If the stabilization device is brought out of water, a gravity load creating by the stabilization device full of water will continue the work of inertia and drag loads. This may be particularly advantageous for systems with relatively high centers of mass, such as helicopters.

The fabric material 102 may be a water impermeable material. Optionally, the fabric material 102 may be a base cloth woven from nylon (or the like) with a polymer coat (e.g., polyurethane coat or the like).

In some embodiments, the collapsible frame 104 may support the fabric material 102 in the deployed configuration to form the column. The collapsible frame 104 may be a flexible plastic bar or tube with a helical configuration or generally helical configuration. The collapsible frame 104 may be sewn into the fabric material 102. Optionally, the collapsible frame 104 may be inserted through a channel formed in the fabric material 102. In further embodiments, the collapsible frame 104 may be attached by adhesives, staples, hooks and/or other fasteners. In many embodiments the collapsible frame 104 may have elastic properties that bias the collapsible frame 104 toward the deployed configuration. Accordingly, in some embodiments, the stabilization device 100 may be passively deployed with the inflation of an attached flotation device. While collapsible frame 104 is illustrated as a helical plastic bar or tube, it should be understood that other collapsible frame structures are possible. In some embodiments, the collapsible frame 104 may be manufactured from nylon. In some embodiments, the use of lightweight fabric and/or a flexible/collapsible frame may allow the stabilization device to avoid damage during controlled ditching or water impact, even if the stabilization device is deployed before, during, or after impact.

In addition, the stabilization device 100 may include a number of openings along the upper portion or top side of the stabilization device 100. For example, stabilization device 100 may include a fishnet fabric 112 along upper portions of the stabilization device 100. The fishnet fabric 112 may allow fluid (e.g., air or water) to enter and exit from the internal volume 110 of the stabilization device 100. These openings may provide a back-up for filling water and may also allow fluids to enter or exit from the internal volume faster. Fishnet material 112 may be preferable for providing the back-up openings as it may simplify manufacturing, has low mass, and is relatively inexpensive material. In some embodiments, simple holes in the fabric 102 can be used and may be reinforced with eyelets to prevent fabric 102 from tearing. While illustrated as having fishnet fabric 112 run along the entire length of the column of the stabilization device 100, in some embodiments, fishnet fabric 112 may only run along less than the full length of the column or along separated portions of the column of the stabilization device 100. In some embodiments, an area of the openings along the column of fabric material may be less than 20% of the total surface area of the column member and preferably 15% or less. For example, in some embodiments, the openings defined by the fishnet and the back end of the column may have a combined area that is 15% or less than the surface area of the fabric 102 of the column.

The column of the stabilization device 100 may further include an attachment strip 114 configured to facilitate attachment of the stabilization device 100 to a float and/or a portion of a water craft. The attachment strip 114 may allow for coupling the stabilization device 100 to a float and/or a water craft. The coupling may be provided by chemical and/or mechanical fasteners. For example, the stabilization device 100 may be coupled with a float by one or more of sewing, adhesives (e.g., epoxy), Velcro straps, snap fasteners, hooks, loops, or the like. The attachment strip 114 may run along an enter length of the column of the stabilization device 100. Alternatively, the attachment strip 114 may be a plurality of separate segments that run along the length of the column of the stabilization device.

Figure 6:
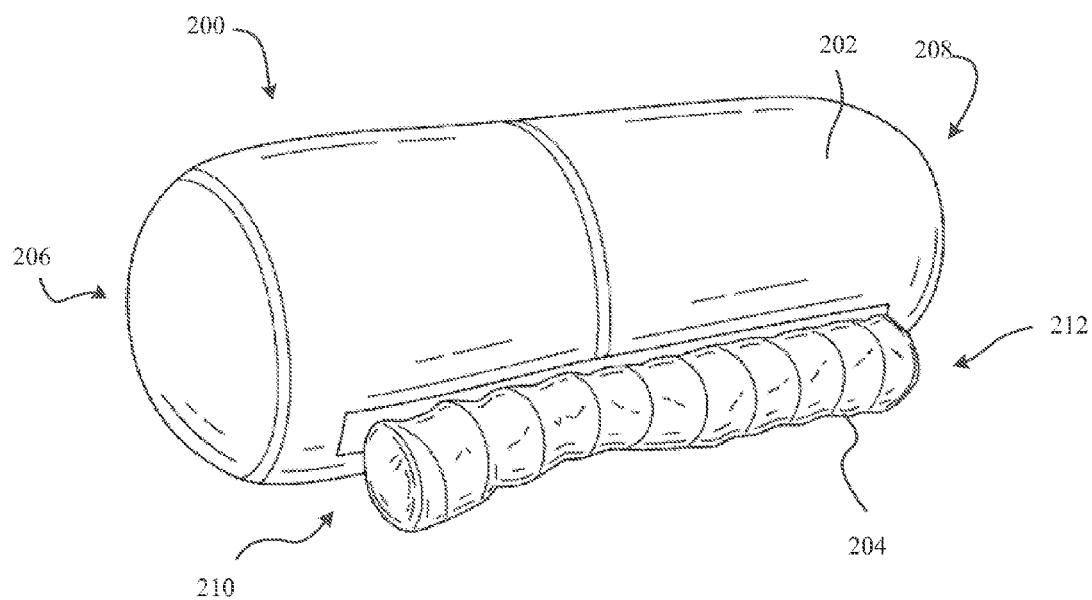
FIG. 6 illustrates an exemplary emergency flotation system according to some embodiments of the present invention.
Figure 7:
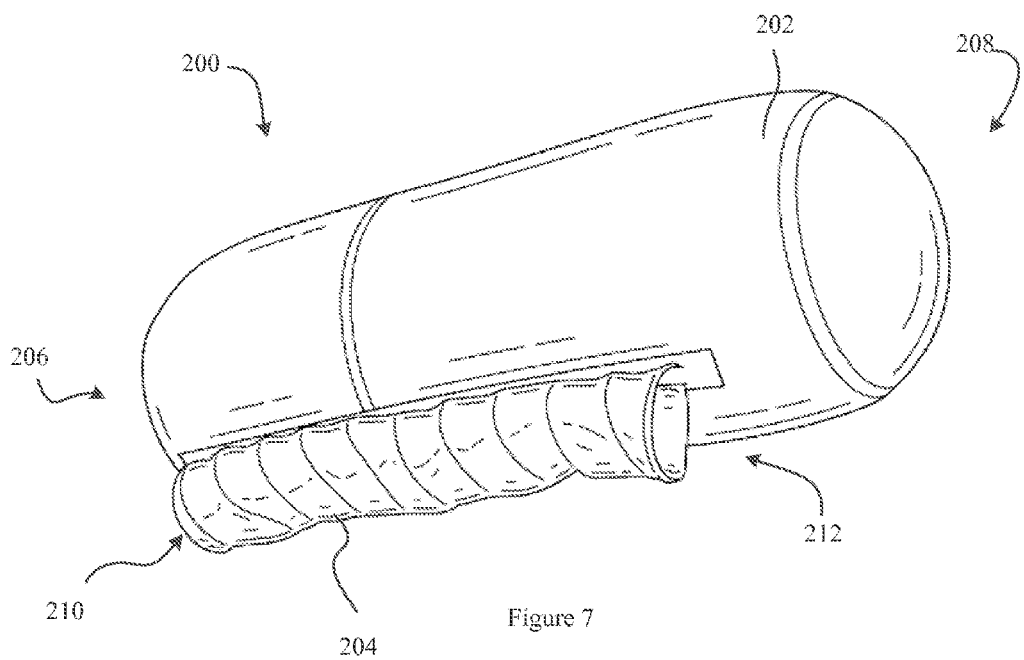
FIG. 7 illustrates another view of the exemplary emergency flotation system of FIG. 6 according to some embodiments of the invention.

FIG. 6 illustrates an exemplary emergency flotation system 200 according to some embodiments of the present invention. FIG. 7 illustrates another view of the exemplary emergency flotation system 200. Emergency flotation system 200 includes an elongate flotation device 202 coupled with a stabilization device 204. The emergency flotation system 200 may include a packed configuration and a deployed configuration. FIG. 6 and FIG. 7 illustrate the emergency flotation system 200 in the deployed configuration and at rest. The packed configuration may be defined by the flotation device 202 in an uninflated configuration and the stabilization device 204 in a collapsed configuration. The deployed configuration may be defined by the flotation device 202 in an inflated configuration and the stabilization device 204 in an expanded configuration. As illustrated, when at rest, the stabilization device 202 is expanded to define an internal volume for filling with water.

In some embodiments, the elongate flotation device 202 may inflate to an elongate capsular shape with a generally cylindrical central portion and rounded ends. The elongate flotation device 202 may have a front end 206, a back end 208, and a length therebetween. The front end 206 and the back end 208 are configured to be generally aligned with the front and back of an attached vehicle, vessel, craft, flotation system, or structure, including but not limited to helicopters or the like.

The stabilization device 204 may be the stabilization device 100 illustrated in FIGS. 3-5. The stabilization device 204 may have a front end 210, a back end 212, and a length therebetween. The front end 210 and the back end 212 may be aligned with the front end 206 and the back end 208 of the flotation device 202. In some embodiments, the stabilization device 204 is generally parallel with the length of the flotation device 202. In some embodiments, the stabilization device 204 may be centered along the length of the flotation device 202.

Figure 8:
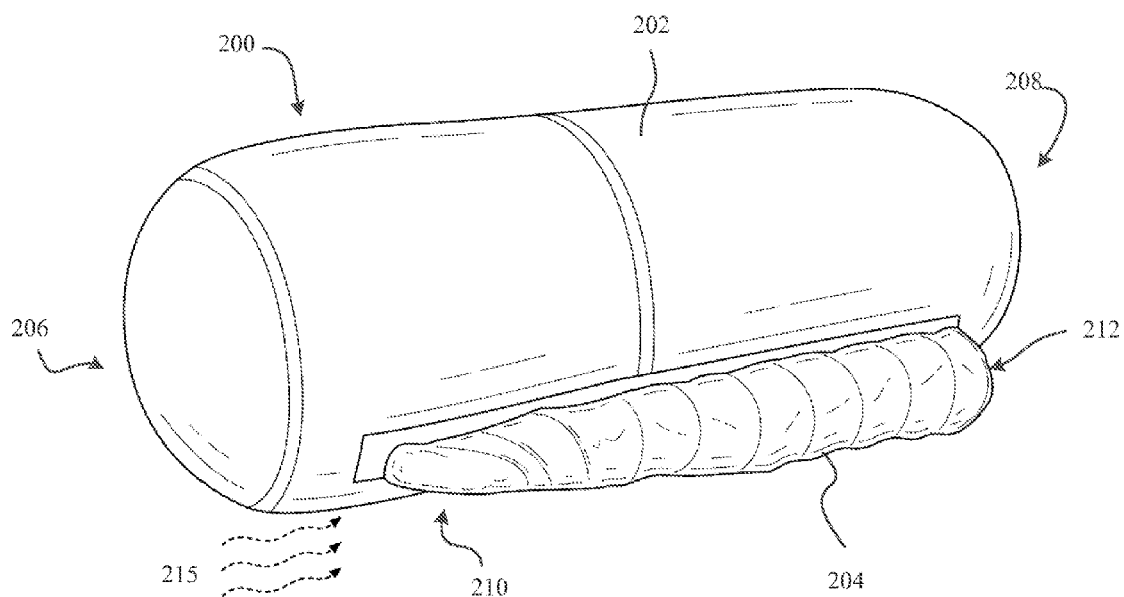
FIG. 8 illustrates the exemplary emergency flotation system of FIG. 6 and FIG. 7 when the system experiences a headwind according to some embodiments of the present invention.

When the emergency flotation system 200 is used with an aircraft, such as a helicopter, it may be desirable to deploy the emergency flotation system 200 during flight and before impacting the water surface. In some situations, integrated or retrofitted emergency flotation systems may become damaged by controlled ditching or water impact and may be rendered wholly or partially ineffective. Accordingly, in some situations, it may be beneficial to deploy the emergency flotation system 200 prior to water impact while the aircraft is still in flight through the air so as to avoid such a problem. Advantageously, in some embodiments, when emergency flotation system 200 is deployed in flight, the stabilization device 204 may be configured to minimally impact flight of the aircraft. This may be particularly advantageous as it may be beneficial to avoid adversely affecting the flight of the aircraft while the aircraft is experiencing an emergency situation. Accordingly, in some embodiments, the flexibility and collapsibility of the stabilization device 204 may allow it to be pressed against the flotation device 202 toward a collapsed configuration or a partially collapsed configuration of the stabilization device 204 if and when the emergency flotation system is deployed during flight. For example, FIG. 8 illustrates the exemplary emergency flotation system 200 of FIG. 6 and FIG. 7 when the system experiences a headwind 215 (e.g., of 50 kts or the like) according to some embodiments of the present invention. As illustrated in FIG. 8, the collapsible stabilization device 204 partially collapses against the flotation device 202 in headwind conditions 215, thereby minimizing drag penalty when the aircraft is in flight. The closed front end 210 of the stabilization device 202 may deflect toward the flotation device 202 to partially collapse the stabilization device 202 when in flight.

Figure 9:
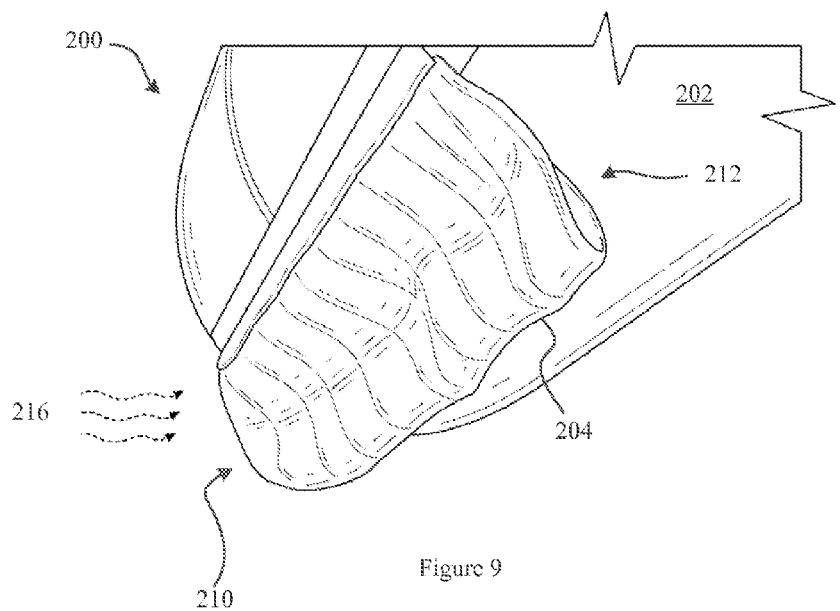
FIG. 9 illustrates the exemplary emergency flotation system of FIG. 6 and FIG. 7 when the system experiences a crosswind according to some embodiments of the present invention.

Further, FIG. 9 illustrates the exemplary emergency flotation system 200 of FIG. 6 and FIG. 7 when the system 200 experiences a crosswind 216 (e.g., of 50 kts or the like) according to some embodiments of the present invention. As demonstrated, the stabilization device 204 may partially collapse along an entire length of the stabilization device 204 during crosswind conditions 216 so as to minimize drag penalty during flight. However, when the system enters the water, the stabilization device 204 may fully expand (as illustrated in FIG. 6 and FIG. 7) and fill with water to provide the increased stability.

Optionally, in some embodiments, the stabilization device 204 may fixed against an inflated flotation device 204 in a collapsed configuration using a water soluble thread or other types of water soluble fasteners. This may improve stabilization device 204 position in flight during emergency situations and minimize or otherwise limit drag penalty due to a partially expanded stabilization device 204. When in water, the water soluble fastener system may dissolve and the stabilization device 204 may expand and deploy automatically. Once deployed in the water, water may fill the internal volume of the stabilization device 204 to provide additional stability to the system while the system floats on the surface of the water.

Figure 10:
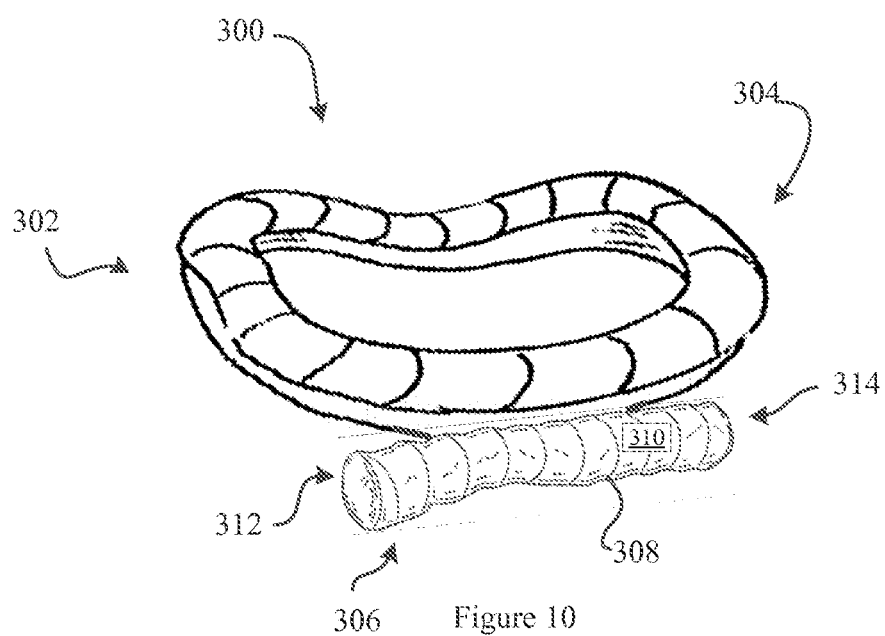
FIG. 10 illustrates an exemplary watercraft according to some embodiments of the present invention.

While embodiments of the invention described above are generally in the context of emergency flotation systems for use with aircraft, it should be understood that other embodiments may be directed to other vehicles, vessels, crafts, flotation systems, and/or structures, such as boats and rafts. For example, FIG. 10 illustrates an exemplary water vessel 300 according to some embodiments. The exemplary water vessel 300 includes a front end (bow) 302 and a back end (stern) 304. The water vessel 300 may be an inflatable, raft for example. The water vessel 300 may further include a stabilization device 306. The stabilization device 306 may be the stabilization device 100, 204 illustrated above. The stabilization device 306 may generally define a column 308 with an internal volume 310. The column 308 may be generally aligned with the front end 302 and back end 304 of the water vessel 300 such that a front end 312 of the stabilization device 306 is forward facing and a back end 314 of the stabilization device 306 is backward facing relative to the water vessel 300. The front end 312 may be closed, and the back end 314 may be open (represented by the dotted line) to allow water to flow in to fill the internal volume 310 from the back end 314. A fishnet material (not shown) may be disposed along a top portion of the column 308 to define a plurality of openings along the top portion of the column 308. In some embodiments, the stabilization device 306 may include a collapsible frame that is passively biased toward the expanded configuration to support a fabric material to form the column 308. In some embodiments, the stabilization device 306 may be secured to the inflatable raft in a closed or collapsed configuration and may deploy with the inflation of the raft. Optionally, the stabilization device 306 may be secured to an inflatable raft with water soluble fasteners such that the stabilization device 306 deploys to the expanded configuration only after the water soluble fasteners dissolve in water or are otherwise removed. While illustrated with only one stabilization device 306, it should be understood that additional stabilization device 306 may be provided (e.g., another stabilization device on the other side of water vessel 300).

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A system comprising:
an emergency flotation system configured for attachment along an aircraft, the emergency flotation system having a flotation device and a stabilization device;
the stabilization device having a length and configured for attachment along a length of the flotation device to increase roll stabilization of the flotation device, the stabilization device comprising:
a fabric material;
a collapsible frame supporting the fabric material, the collapsible frame having a collapsed configuration and an expanded configuration, the expanded configuration of the collapsible frame supporting the fabric material to form a column of the fabric material, the column of fabric material having a front end, a back end, and a length therebetween and defining an internal volume, wherein the front end of the column of fabric material resists fluid entry to the internal volume defined by the column of fabric material, and wherein the back end of the column of fabric material defines an opening for receiving water for filling the internal volume defined by the column of fabric material when the collapsible frame is in the expanded configuration.

2. The system of claim 1, wherein the collapsible frame comprises a helical plastic bar.

3. The system of claim 1, wherein the column of fabric formed by the expanded configuration of the collapsible frame has a circular cross-section.

4. The system of claim 1, wherein the collapsible frame is biased toward the expanded configuration.

5. The system of claim 1, further comprising openings along a top portion of the column of fabric material formed when the collapsible frame is in the expanded configuration.

6. The system of claim 5, wherein the openings along the top portion of the column of fabric material are defined by fishnet material disposed along the top portion of the column of fabric material formed when the collapsible frame is in the expanded configuration.

7. The system of claim 6, wherein the fishnet material runs along an entire length of the column of fabric material formed when the collapsible frame is in the expanded configuration.

8. The system of claim 1, wherein the fabric material covering the front end of the column of fabric material formed when the collapsible frame is in the expanded configuration is configured to resist air entry into the internal volume defined by the column of fabric material such that air forced against the front end of the column of fabric material urges the collapsible frame from the expanded configuration toward the collapsed configuration.

9. The system of claim 1, wherein the fabric material forming the column of fabric material formed when the collapsible frame is in the expanded configuration is configured to resist air entry into the internal volume defined by the column of fabric material such that air forced laterally against the column of fabric material urges the collapsible frame from the expanded configuration toward the collapsed configuration.

10. The system of claim 1, wherein the length of the column of fabric material formed when the collapsible frame is in the expanded configuration is greater than at least half the length of the flotation device.

11. The system of claim 10, wherein the length of the column of fabric material formed when the collapsible frame is in the expanded configuration is greater than at least three-fourths the length of the flotation device.

12. An aircraft, comprising the system of claim 1.

13. A system comprising:
an emergency flotation system configured for attachment along an aircraft, the emergency flotation comprising:
a flotation device inflatable from an uninflated state to an inflated state, the flotation device in the inflated state having front end, a back end, and a length therebetween;
a stabilization device having a length and attached along the length of the flotation device, the stabilization device comprising a collapsible fabric material having an collapsed configuration and an expanded configuration, the collapsible fabric material being biased toward the expanded configuration where the fabric material forms a column of the fabric material, the column of fabric material having a front end, a back end, and a length therebetween and defining an internal volume, wherein the front end of the column of fabric material is covered by the fabric material, and wherein the back end of the column of fabric material defines an opening for receiving water for filling the internal volume defined by the column of fabric material when the fabric material is in the expanded configuration.

14. The system of claim 13, wherein the fabric material is internally supported by an elastic frame that biases the fabric material toward the expanded configuration.

15. The system of claim 13, wherein the column of the fabric material formed when the fabric material is in the expanded configuration is parallel and centered with the flotation device when the flotation device is in the inflated state.

16. The system of claim 13, wherein the stabilization device is in the collapsed configuration when the flotation device is in the uninflated configuration and wherein the stabilization device transitions towards the expanded configuration only with the inflation of the flotation device.

17. The system of claim 13, wherein the stabilization device is maintained in the collapsed configuration against the flotation device with water soluble fasteners.

18. A boat, comprising:
a stabilization device having a length and attached to a side of the boat to increase roll stabilization of the boat, the stabilization device comprising:
a fabric material;
a collapsible frame supporting the fabric material, the collapsible frame having a collapsed configuration and an expanded configuration, the expanded configuration of the collapsible frame supporting the fabric material to form a column of the fabric material, the column of fabric material having a front end a back end, and a length therebetween and defining an internal volume, wherein the front end of the column of fabric material resists fluid entry to the internal volume defined by the column of fabric material and wherein the back end of the column of fabric material defines an opening for receiving water for filling the internal volume defined by the column of fabric material when the collapsible frame is in the expanded configuration.

* * * * *